(12) United States Patent
Aparicio, IV et al.

(10) Patent No.: US 7,478,090 B2
(45) Date of Patent: Jan. 13, 2009

(54) METHODS, SYSTEMS AND COMPUTER PROGRAM PRODUCTS FOR ANALOGY DETECTION AMONG ENTITIES USING RECIPROCAL SIMILARITY MEASURES

(75) Inventors: Manuel Aparicio, IV, Chapel Hill, NC (US); Yen-min Huang, Cary, NC (US); David R. Cabana, Cary, NC (US)

(73) Assignee: Saffron Technology, Inc., Morrisville, NC (US)

( * ) Notice: Subject to any disclaimer, the term of this patent is extended or adjusted under 35 U.S.C. 154(b) by 496 days.

(21) Appl. No.: 11/035,472

(22) Filed: Jan. 14, 2005

(65) Prior Publication Data

US 2008/0306944 A1    Dec. 11, 2008

(51) Int. Cl.
G06F 7/00 (2006.01)
G06F 17/30 (2006.01)
(52) U.S. Cl. .............................................. 707/6; 707/3
(58) Field of Classification Search .................... 707/1, 707/5, 7, 101; 704/2, 5, 7, 9
See application file for complete search history.

(56) References Cited

U.S. PATENT DOCUMENTS 6,131,082 A * 10/2000 Hargrave et al. ............... 704/7
6,581,049 B1    6/2003 Aparicio, IV et al.
7,191,115 B2 * 3/2007 Moore ............................ 704/2

OTHER PUBLICATIONS

Rhode et al., "An Improved Method for Deriving Word Meaning from Lexical Co-Occurunce", Mar. 22, 2004.*
Ertöz et al., Finding Topics in Collections of Documents: A Shared Nearest Neighbor Approach, from *Clustering and Information Retrieval*, Kluwer Academic Publishers, 2004.
Fleming et al., *Network of Networks of Associative Memory Networks for Knowledge Management*, U.S. Appl. No. 10/980,520, filed Nov. 3, 2004.
Jarvis et al., *Clustering Using a Similarity Measure Based on Shared Near Neighbors*, IEEE Transactions on Computers, vol. C-22, No. 11, Nov. 1973, pp. 1025-1034.

* cited by examiner

*Primary Examiner*—Christian P. Chace
*Assistant Examiner*—Michael J Hicks
(74) *Attorney, Agent, or Firm*—Myers Bigel Sibley & Sajovec

(57) ABSTRACT

Analogies among entities may be detected by obtaining associative counts among the entities and computing similarity measures among given entities and other entities, using the associative counts. First and second entities are then identified as being analogies if the first entity has a strongest similarity measure with respect to the second entity and the second entity also has a strongest similarity measure with respect to the first entity. The similarity measures may be calculated using a normalized entropy inverted among a given entity and other entities.

19 Claims, 12 Drawing Sheets

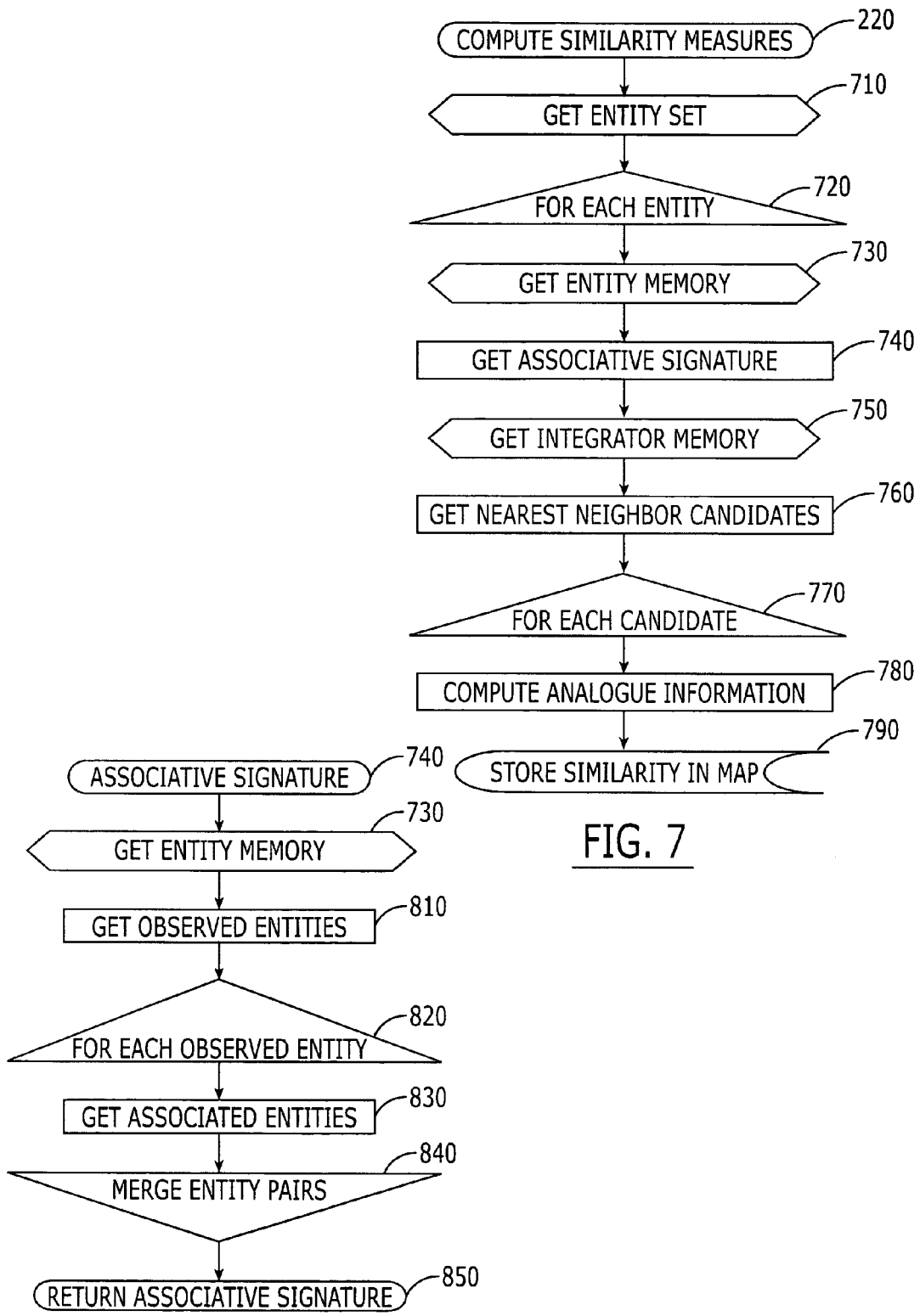

METHODS, SYSTEMS AND COMPUTER PROGRAM PRODUCTS FOR ANALOGY DETECTION AMONG ENTITIES USING RECIPROCAL SIMILARITY MEASURES

FEDERALLY SPONSORED RESEARCH

This invention was made at least in part with government support under Defense Advance Research Projects Agency (DARPA), Contract No. MDA972-03-9-001. The government may have certain rights to this invention.

FIELD OF THE INVENTION

This invention relates to knowledge management methods, systems and computer program products, and more particularly to methods, systems and computer program products that can detect analogies.

BACKGROUND OF THE INVENTION

Associative memories, also referred to as content addressable memories, are widely used in the field of pattern matching and identification, expert systems, artificial intelligence and analogy detection. As used herein, analogy detection is an associative memory function that finds similar things to a given thing. Analogy detection may be useful for data cleansing, alias detection, and other applications. Analogy-based reasoning also can use analogy detection across a set of related things, and may be used for many different applications, including hypothesis generation.

For analogy detection, similarity is generally used as a defining criteria. However, similarity metrics by themselves may not provide decisions. For example, everything may be considered similar to everything else, even if the only element in common is in being a "thing". Thus, analogy detection should decide how much similarity is needed to consider two things as effectively the same, given the task at hand. Conventional analogy detection may determine similarity by setting a threshold which is based on the tradeoffs between hits, missed opportunities, false alarms and correct rejections. Other conventional analogy detection may include such decision theories as hyperplane separation models which may try to fit the data on one or another side of a separation plane.

It is also known to use various measurements of similarity by considering the similarity of two objects, each described as a vector of attributes. For example, the cosine of the angle between two vectors is known as a measure of document similarity. Jacquard similarity, the proportion of overlapping attributes, is also known in building biological taxonomies. Edit distance is yet another measure that may be used for alphabet detection, such as when comparing text strings of letters or protein sequences of amino acids.

Similarity measures also may be an underlying basis for clustering, such as in methods for market segmentation of hierarchical classification. K-mean clustering can be used to place an item in one group or another, wherein the group is best defined by its average center. Bootstrapping techniques also may be used to look for similarities from a graph perspective, by traversing links in search for other nodes that share the same connections. Finally, mutual neighbor techniques, also called shared nearest neighbor techniques, look to confirm each node-node value in a similarity matrix by also asking how well the similar nodes share the same set of nearest neighbors.

Notwithstanding these and/or other techniques, there continues to be a desire to provide analogy detection methods, systems and computer program products that can provide more accurate analogy detection among large numbers of entities, for alias detection, data cleansing and/or other applications.

SUMMARY OF THE INVENTION

Analogies among a plurality of entities may be detected according to various embodiments of the present invention, by obtaining associative counts among the plurality of entities and computing respective similarity measures among respective given entities and other entities among the plurality of entities, using the associative counts. First and second entities are then identified from the plurality of entities as being analogies if the first entity has a strongest similarity measure with respect to the second entity and the second entity also has a strongest similarity measure with respect to the first entity. After identifying the first and second entities, other entities in the plurality of entities also may be identified as being analogies of the first and/or second entities. Accordingly, reciprocal similarity measures are used to determine analogies, in some embodiments of the invention.

Various techniques may be used in other embodiments of the present invention to compute the respective similarity measures among respective given entities and other entities among the plurality of entities using the associative counts. These techniques also may be used to compute similarity measures independent of analogy detecting according to various embodiments of the present invention. In some embodiments, a normalized entropy inverted among a respective given entity and other entities among a plurality of entities is computed, using the associative counts. In other embodiments, a similarity of the given entity to another entity from a perspective of a third entity, relative to an overall similarity of entities to one another from the perspective of the third entity, is computed. This computation may take place by computing a pair entropy of the given entity and the other entity from the perspective of the third entity, computing an overall entropy of entities to one another from the perspective of the third entity, computing a maximum overall entropy of entities to one another from the perspective of the third entity, and combining the pair entropy, the overall entropy, and the maximum overall entropy. Combining may take place by dividing the overall entropy minus the pair entropy by a log of the maximum overall entropy, to obtain a result. In other embodiments, the result is subtracted from one (1).

In some embodiments, the respective similarity measures among the respective given entities and the other entities among the plurality of entities may be computed by identifying candidate entities from among the plurality of entities, and computing respective similarity measures among the respective given entities and the candidate entities, using the associative counts. Moreover, in some embodiments, the candidate entities may be identified by obtaining an entity associative memory that identifies associations among the other entities from a perspective of the given entity, and using the associations that are identified in the entity associative memory to identify the candidate entities. In still other embodiments, the overall entropy of the plurality of entities to one another from the perspective of the third entity may be computed by incrementing at least one variable as new associative counts are obtained, so that the overall entropy need not be recomputed as new associative counts are obtained.

It will be understood that embodiments of the invention have been described above primarily with respect to method embodiments. However, analogous system embodiments and/or analogous computer program product embodiments also may be provided.

BRIEF DESCRIPTION OF THE DRAWINGS

FIG. 7 is a flowchart of operations that may be performed to compute similarity measures according to various embodiments of the present invention.

FIG. 8 is a flowchart of operations that may be performed to obtain an associative signature according to various embodiments of the present invention.

DETAILED DESCRIPTION

Figure 1:
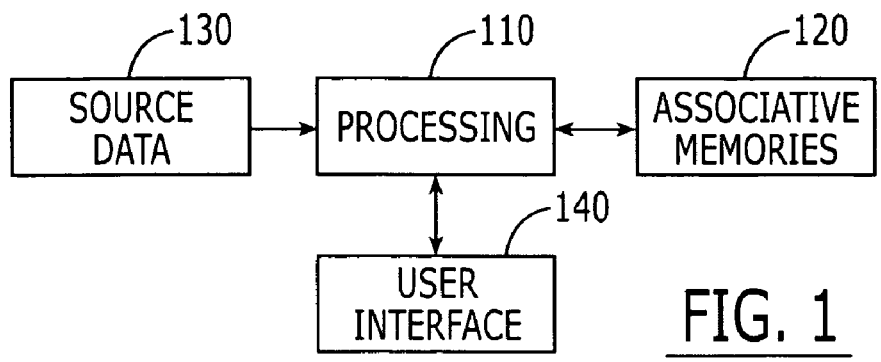
FIG. 1 is a block diagram of analogy detection methods, systems and/or computer program products according to various embodiments of the present invention.

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled", "connected" or "responsive" to another element, it can be directly coupled, connected or responsive to the other element or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described in part below with reference to block diagrams and flowcharts of methods, systems and computer program products according to embodiments of the invention. It will be understood that a block of the block diagrams or flowcharts, and combinations of blocks in the block diagrams or flowcharts, may be implemented at least in part by computer program instructions. These computer program instructions may be provided to one or more enterprise, application, personal, pervasive and/or embedded computer systems, such that the instructions, which execute via the computer system(s) create means, modules, devices or methods for implementing the functions/acts specified in the block diagram block or blocks. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products and/or systems (structural and/or means-plus-function).

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

FIG. 1 is a block diagram of analogy detection methods, systems and/or computer program products according to various embodiments of the present invention. As shown in FIG. 1, these analogy detection methods, systems and/or computer program products include a processing system, method and/or computer program product 110 that interacts with one or more associative memories 120 to detect analogies among a plurality of entities that are included in source data 130. Processing block 110 may be controlled by a user through a user interface 140, and the outputs of analogy detection may be displayed, for example, in graphical form, via the user interface 140.

It will be understood that the term "entity" includes a person, place or thing for which an analogy is to be detected and may also include other data terms and/or concepts, such as verbs. Moreover, the source data 130 can include source documents, database records or other data sources that are well known to those having skill in the art. Finally, the associative memories 120 may be embodied using an associative memory network of U.S. Pat. No. 6,581,049 to coinventor Aparicio, IV et al., entitled "Artificial Neurons Including Power Series of Weights and Counts That Represent Prior and Next Associations", and assigned to the assignee of the present invention, the disclosure of which is hereby incorporated herein by reference in its entirety as if set forth fully herein. These associative memory networks may scale linearly or almost linearly and thereby allow large networks of associative memories to be provided. However, in other embodiments of the present invention, other associative memory architectures may be used.

It will also be understood that the blocks of FIG. 1 may be embodied as one or more enterprise, application, personal, pervasive and/or embedded computer systems and/or special purpose hardware that may be connected by a wired and/or wireless network. The blocks of FIG. 1 may also include one or more general purpose data processors that execute one or more stored programs, one or more special purpose processors and/or special purpose hardware. For ease of nomenclature, a given system, method and/or computer program product that is illustrated in the drawings may also be referred to herein as a "block". Moreover, the associative memories 120 may be stored in one or more general purpose memory devices and/or special purpose associative memory devices. These memory devices may represent an overall hierarchy of memory devices containing software and/or data used to implement the associative memories 120. The memory devices can include, but are not limited to, the following types of devices: cache, ROM, PROM, EPROM, EEPROM, flash memory, SRAM and/or DRAM.

Figure 2:
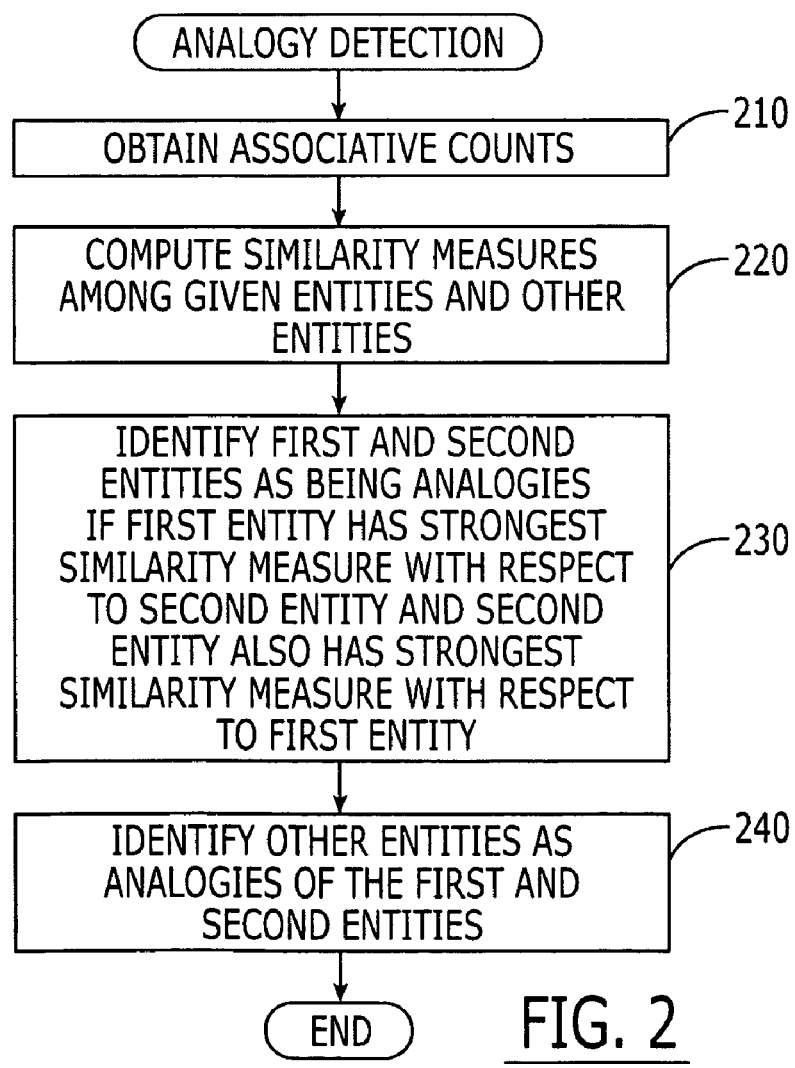
FIG. 2 is a flowchart of operations that may be performed to detect analogies according to various embodiments of the present invention.

FIG. 2 is a flowchart of operations that may be performed to detect analogies among a plurality of entities according to various embodiments of the present invention. Operations of FIG. 2 may be performed, for example, by the processing block 110 of FIG. 1 in conjunction with the associative memories 120, using the source data 130 and the user interface 140.

Referring to FIG. 2, associative counts are obtained among the plurality of entities based on the source data 130 (Block 210). The obtaining of associative counts among entities from source data is well known to those having skill in the art and need not be described further herein.

Then, at Block 220, operations are performed to compute respective similarity measures among respective given entities and other entities among the plurality of entities using the associative counts. Many techniques may be used to compute the similarity measures. Some techniques that may be used according to embodiments of the present invention will be described in detail below. At Block 230, operations are performed to identify first and second entities from the plurality of entities as being analogies if the first entity has a strongest similarity measure with respect to the second entity and the second entity also has a strongest similarity measure with respect to the first entity. This technique for identifying analogies among entities may be referred to herein as "reciprocal similarity" or "reciprocal coherence". Details will be provided below. Finally, at Block 240, having identified the first and second entities as analogies, other entities may be identified as being analogies of the first and second entities using techniques that will be described in detail below.

Figure 3:
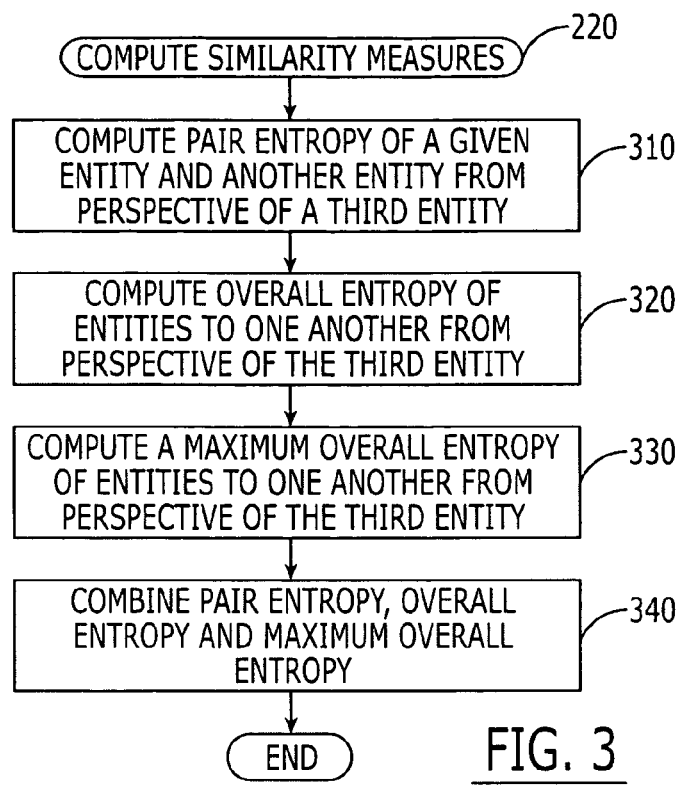
FIG. 3 is a flowchart of operations that may be performed to compute similarity measures according to various embodiments of the present invention.

FIG. 3 is a flowchart of operations that may be performed to compute respective similarity measures among respective given entities and other entities among the plurality of entities according to various embodiments of the present invention. These operations may correspond to Block 220 of FIG. 2. In general, in some embodiments of the invention, similarity measures may be computed by computing a respective normalized entropy inverted among a respective given entity and other entities among the plurality of entities, using the associative counts. In other embodiments, similarity measures may be computed by determining a similarity of the given entity to another entity from a perspective of a third entity, relative to an overall similarity of entities to one another from the perspective of the third entity.

More specifically, referring to FIG. 3, at Block 310, operations are performed to compute a "pair entropy" of the given entity and the other entity from the perspective of the third entity. Operations are performed at Block 320 to compute an "overall entropy" of entities to one another from the perspective of the third entity. Operations are performed at Block 330 to compute a "maximum overall entropy" of entities to one another from the perspective of the third entity. Finally, at Block 340, the pair entropy, the overall entropy and the maximum overall entropy are combined, to produce a measure of similarity. It will be understood by those having skill in the art that the operations of Blocks 310, 320 and 330 may be performed out of the order shown in FIG. 3, and may be performed at least partially simultaneously, as will be described in detail below.

As was described above, at Block 340, the pair entropy, overall entropy and maximum overall entropy may be combined. In some embodiments, the overall entropy minus the pair entropy are divided by a log of the maximum overall entropy to obtain a result. The result may then be subtracted from one to obtain a normalized entropy inverted. Additional details will be provided below.

Figure 4:
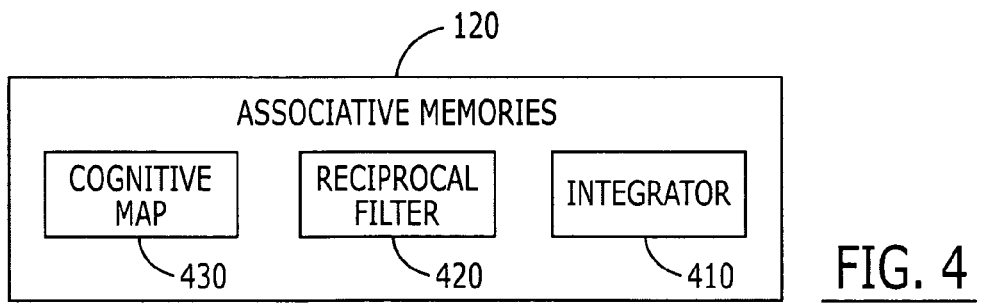
FIGS. 4 and 5 are block diagrams of memories that may be used according to various embodiments of the present invention.

FIG. 4 illustrates an architecture of memories, such as associative memories 120 of FIG. 1, according to various embodiments of the present invention. As shown in FIG. 4, an integrator 410, a reciprocal filter 420 and a cognitive map 430 may be included.

The integrator 410 may be a conventional associative matrix that totals (integrates) associations among various entities as source data 130 is provided. Thus, in some embodiments, the integrator 410 can be the primary associative matrix, which observes incoming entities and their associations to each other. The integrator 410, by seeing the incoming entities, can compute the entropies of every value as a measure of information. It can also provide a global lookup function. Thus, given any set of inputs, it can determine the other inputs associated with them.

Cognitive map 430, also referred to as a "distance map" or simply as a "map", may be used to store similarity measures among a given entity and other entities among the plurality of entities. Unlike the integrator memory 410 that contains associative counts in its matrix, the cognitive map contains measures of similarity, according to some embodiments of the invention. These measures of similarity may be computed from the integrator memory 410, as will be described below. Since this computation may be computationally expensive, the cognitive map 430 may be embodied as a persistent memory cache of this information.

The reciprocal filter 420, also simply referred to as a "filter", can include transient computations that may be performed to represent those entities that are reciprocally coherent. Coherence filtering can be performed rapidly, so that persistent caching may not be needed. This transience can allow for context dependency, so that the cognitive map 430 can represent the similarities as defined by the data, while the reciprocal filter 420 allows for real time biasing of a relevant sub-map according to some embodiments of the invention.

Figure 5:
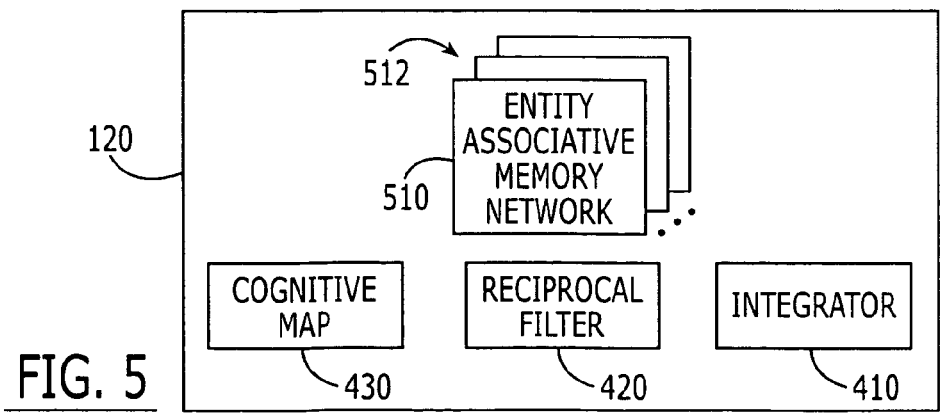

FIG. 5 is a block diagram of memories, such as associative memories 120 of FIG. 1, according to other embodiments of the present invention. These embodiments add a network 512 of entity associative memory networks 510. A respective entity associative memory network 510 includes therein associations among a respective observer entity and a plurality of observed entities that are observed by the respective observer entity, based upon the source data. Stated differently, a respective entity associative memory network 510 includes associations between pairs of entities from a perspective of a third entity, wherein the pairs of entities may be referred to as observed entities, and the third entity may be referred to as an observer entity.

Thus, for example, when source data 130 is observed into the associative memories 120, a separate entity associative memory network 510 may be created and populated by associations among a given observer entity and a plurality of observed entities that are observed by the observer entity. An observer denotes an entity from whose perspective observed entities are stored in a respective associative memory network 510. By providing a network 512 of entity associative memory networks 510, a respective one of which is arranged from the perspective of a respective observer entity, contextual associations may be provided among observer entities and observed entities. This contextual context can allow more efficient computation of candidate entities for analogy detection, as will be described in detail below. Moreover, the network 512 of entity associative memory networks 510 also may be used for other knowledge management purposes, as described, for example, in application Ser. No. 10/980,520, filed Nov. 3, 2004, entitled Network of Networks of Associative Memory Networks for Knowledge Management, to Fleming et al., assigned to the assignee of the present invention, the disclosure of which is hereby incorporated herein by reference in its entirety as if set forth fully herein. For the sake of brevity, an entity associative memory network 510 may also be referred to herein as an "entity memory" 510.

Thus, while the integrator memory 410 stores associations at large, each entity can have its own specialized memory 510 in embodiments of FIG. 5. In these specialized memories 510, the original data can be conditioned to each entity, storing the associations around each of its mentions in the data. This can provide a nonlinear model that is able to represent triples. For example, given Person:A, Person:D is associated with Person:Y. The general scope of the integrator 410 may not provide such triple associative information. As will be described in detail below, the specialization provided by the entity memories 510 can provide a nonlinear signature of each entity in order to measure the nonlinear-similarity between two entity signatures. Thus, for example, many persons may have traveled to many cities, but the entity memory 510 can specifically remember who traveled to where and with whom, which is a deeper basis for similarity. On the other hand, the entity memories 510 may not be able to compute the entropy of each entity and association at large, which can remain the responsibility of the integrator 410. The integrator 410 can also provide general associative lookup functions about which entities are connected to which others. Thus, both coarse-grained and fine-grained memories may be used.

Figure 6:
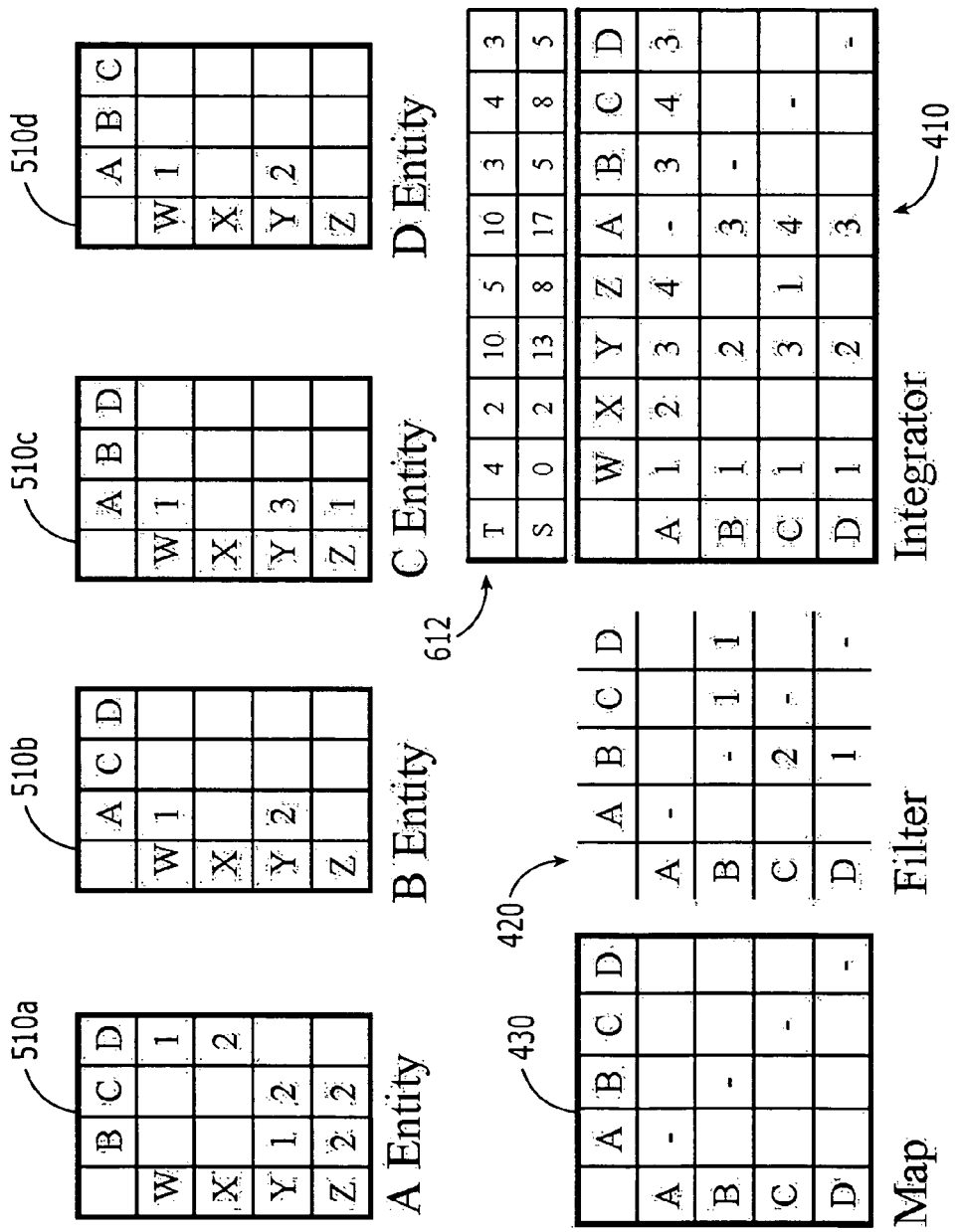
FIG. 6 is a block diagram of an example of memories of FIG. 5 that are populated with data for eight example entities, according to exemplary embodiments of the present invention.

FIG. 6 is a block diagram of an example of associative memories 120 of FIG. 5 that can be used for analogy detection among entities A, B, C, D, W, X, Y and Z. This simplified example of eight entities may be used for illustrative purposes, and will be used consistently as an example throughout the following description. It will be understood, however, that methods, systems and computer program products according to embodiments of the present invention will generally be used to detect analogies among much larger numbers of entities, on the order of thousands, hundreds of thousands, millions or more. Moreover, for the purposes of the example, it will be assumed that entities A, B, C and D are members of a first entity class, such as Persons, and entities W, X, Y and Z are members of a second entity class, such as Places. However, in other embodiments, a single class or more than two classes may be provided.

As shown in FIG. 6, four entity memories 510a-510d are provided, a respective one of which includes associative counts among observed entities in the context of an observer entity A, B, C or D, respectively. A cognitive map 430, a reciprocal filter 420 and an integrator 410 also are provided. An entropy cache 612 also may be provided to store and update the variables T and S, so as to reduce or avoid the need to recompute overall entropy, as will be described in more detail below. The entropy cache 612 may be part of the integrator 410 or separate therefrom.

FIG. 7 is a flowchart of operations that may be performed to compute similarity measures among a given entity and other entities according to various embodiments of the present invention, which may correspond to Block 220 of FIG. 2. More specifically, prior to performing the operations of FIG. 7, the source data 130 is read and the integrator 410 and entity memories 510 are populated. In particular, the integrator 410 learns the associative count for all entities to all other entities across all data records. The entity memories 510 learn the coincidences of all other entities for a given entity that is mentioned in the data records.

Referring now to FIG. 7, the entity set is obtained at Block 710. Then, for each entity at Block 720, the relevant entity memory 510 is obtained at Block 730 and an associative signature is generated at Block 740. Computation of an associative signature will be described in detail below. In general, however, using a respective entity memory 510 as the most specific, nonlinear source of information, the entity memory 510 provides a signature that can provide the most informative subset of entities that can be used to describe a given entity. Using these associative signatures, the integrator memory 410 is used, at Block 750, to identify nearest neighbor candidates at Block 760. Thus, using the integrator memory 410, the signature of each entity is used as a set of keys for associative lookup of other entities that also have the same observed entities. This can provide a first pass determination of potential analogies, before looking into the detailed pairwise information. Therefore, Block 760 may not produce the final answer, but only an initial set of potentially analogous entities that are called "candidates".

Continuing with the description of FIG. 7, at Block 770, for each candidate, analog information is computed at Block 780. The analog information may be accumulated to provide a similarity measure among a given entity and other entities, as will be described in detail below. In some embodiments, the analog information or similarity measure is based on normalized entropy inverted, which can be computed as was already described in connection with FIG. 3. Thus, a nonlinear comparison of information, including a measure of differential information, is used to measure similarity between each entity and each candidate in some embodiments. These similarity measures are stored in the cognitive map 430 at Block 790.

FIG. 8 is a flowchart of operations that may be performed to obtain an associative signature, which may correspond to Block 740 of FIG. 7. At Block 810, observed entities that are listed in the entity memory 510 that was obtained at Block 730 are obtained. Since each entity memory 510 lists only those observed entities to which it is associated, the list of such observed entities can become the primary basis for characterizing the observer entity. In some embodiments, all observed entities are obtained at Block 810. However, in other embodiments, metrics such as frequency or entropy may be used to obtain a set of "best" observed entities. Then, at Block 820, for each observed entity, associated observed entities are obtained at Block 830. More specifically, for each observed entity known to an observer entity, the entity memory 510 can also report the strongest associations of other observed entities. While not an exhaustive representation of the complete entity memory 510, the list of best observed entities and its best associations can provide a distinct nonlinear description of the observer entity as a function of its surrounding coincidences. A list of entities and associations is merged into a single structure called the "associative signature" at Block 840.

Figure 9:
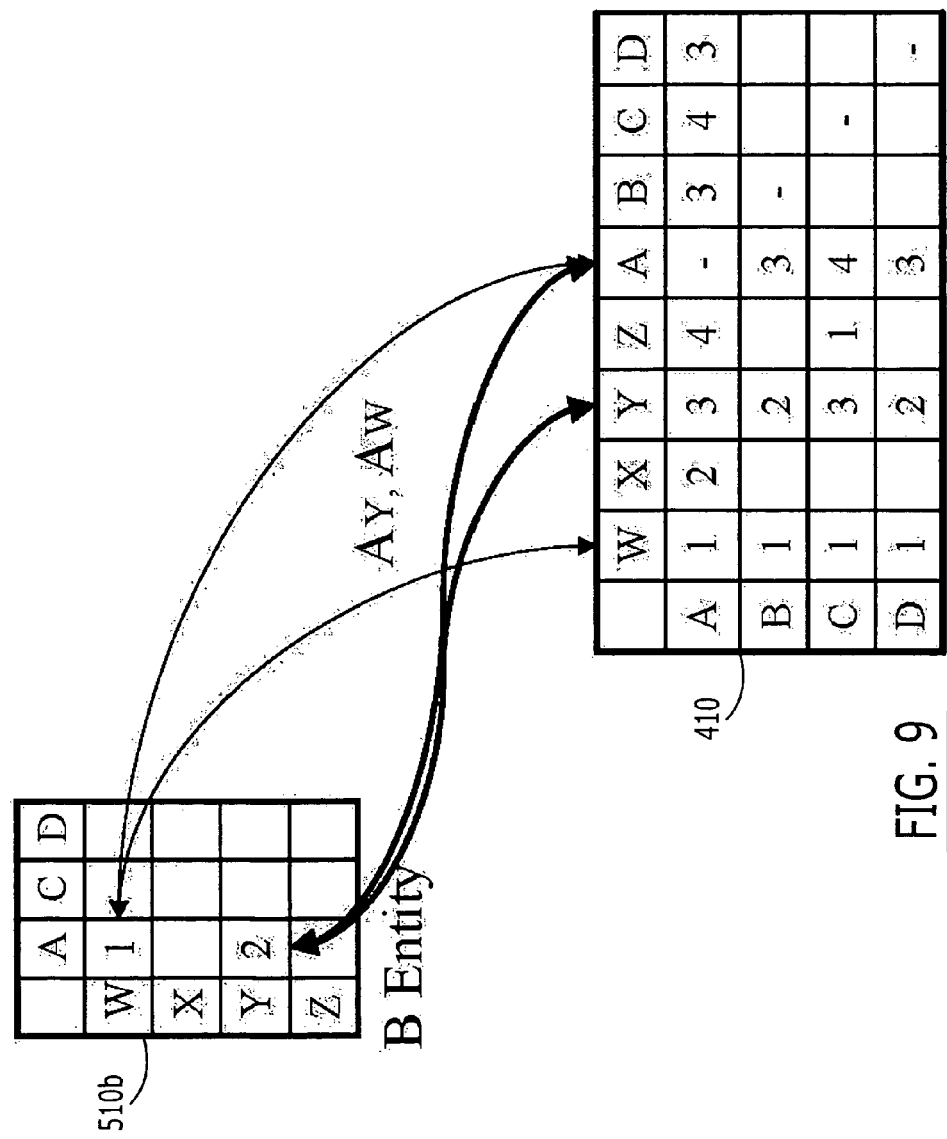
FIG. 9 illustrates an example of obtaining an associative signature according to embodiments of FIG. 8.

FIG. 9 demonstrates the construction of an associative signature where the entity memory 510b for entity B is used. Thus, in entity memory 510b, observed entities are correlated with each other conditional on observer entity Person:B. While the integrator memory 410 would describe Person:B as strongly associated with City:W, it can also be seen that City:W is coincident with Person:A. In other words, the City:W AND Person:A association is a deeper, nonlinear description of Person:B. Not only does Person:B visit City:W, he did so with Person:A, at least once in this simple example.

Depending on the application, such nonlinear predictive strength may or may not be used. For simple data cleansing in which there are highly informative entities and only a few are altered, such as by data error or as natural variants, the power of linear signatures when combined with similarity measures described below might suffice. However, consider difficult cases in which the entity space is "saturated". For example, suppose in the extreme that everybody has traveled to City:W and that everybody has traveled with Person:A. From a linear perspective, City:W and Person:A are independently saturated and are totally uninformative. In this case, similarities and distinctions may only be made by referring to the interactions of entities. Everybody might have visited City:W and traveled with Person:A, but fewer should have visited City:W with Person:A. When analogies are hidden by such linear saturation or other forms of population "noise", then nonlinear signatures may be used for better detection. This is also true when the data is very sparse; given a greater absence of linear information, the extraction of the nonlinear information can help compensate.

It will be understood by one skilled in the art that performance variations can be provided in generating a nonlinear signature, according to some embodiments of the invention. For instance, as will be described below, the integrator memory 410 contains information about each and every entity. Such information can be used to select those entities of the signature that will have the most information in subsequent process while ignoring those with little if any effect. Rather than describing each entity by its complete set of observed entities (and associated observed entities), such modifications can describe each entity as a signature of only the most informative observed entities, which can enhance or optimize subsequent processing.

Although more complex models may generally represent the signature as a subset of the associations, FIG. 9 shows how, in this simple example, $\{A_Y, A_W\}$ (indicating primary observed entities with secondary associations) describe what is known about Entity B. FIG. 9 also shows how these signature attributes map back to the integrator memory 410 for subsequent activation and processing.

Figure 10:
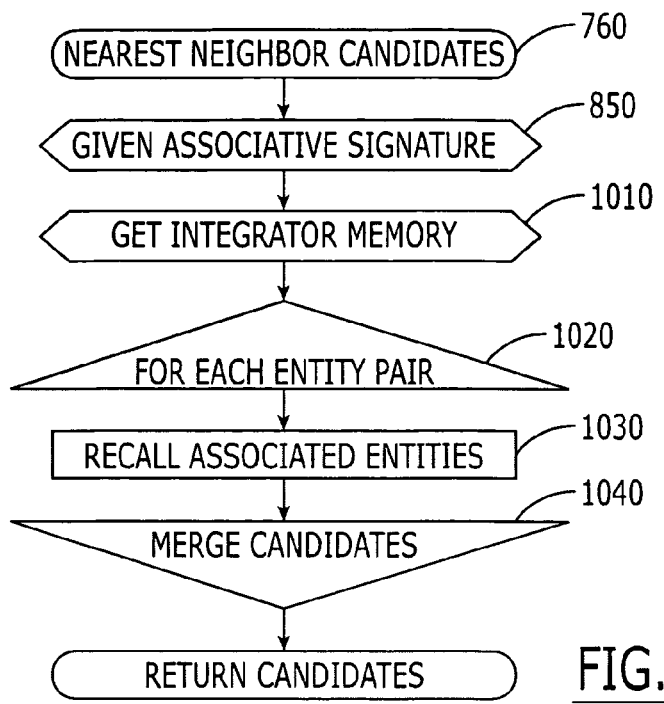
FIG. 10 is a flowchart of operations that may be performed to obtain nearest neighbor candidates according to various embodiments of the present invention.

FIG. 10 is a flowchart of operations that can be used to obtain nearest neighbor candidates, which may correspond to Block 760 of FIG. 7. Operations begin with a given associative signature (Block 850 of FIG. 8). The operations recall other entities from the integrator memory 410 given the original entity's associative signature. Operations loop through the signature, pair by pair, activating both entities of the pair, and recalling and scoring other entities associated with the pair. Thus, for each entity pair at Block 1020, the associated entities are recalled at Block 1030. The exact technique for recall may be dependent upon the associative memory implementation. However, it is generally known how to "imagine" unknown entities given the conditions of other entities. Mathematically, given the entities in the pair, the memory can be set to imagine the most likely associated entities, excluding the original observer entity. The likelihood for each candidate for each pair can be accumulated for the candidate. For instance, if a candidate is highly likely given one pair, then this high score is added to the accumulation of prior scores for other entity pairs. A list of all likely candidates, given all pairs, is merged at Block 1040, and sorted by the accumulated score. These likely entities are called "candidates", because further analysis of their similarity may still be performed below.

Note that, in some embodiments, there is no penalty for a candidate that is missing a pair of attributes. The accumulation of likelihood scores is additive when a likelihood exists, but no assumption need be made about the absence of evidence. Unlike other techniques, there may be no penalty, because a penalty may incorrectly assume that absence of evidence is evidence of absence.

Figure 11:
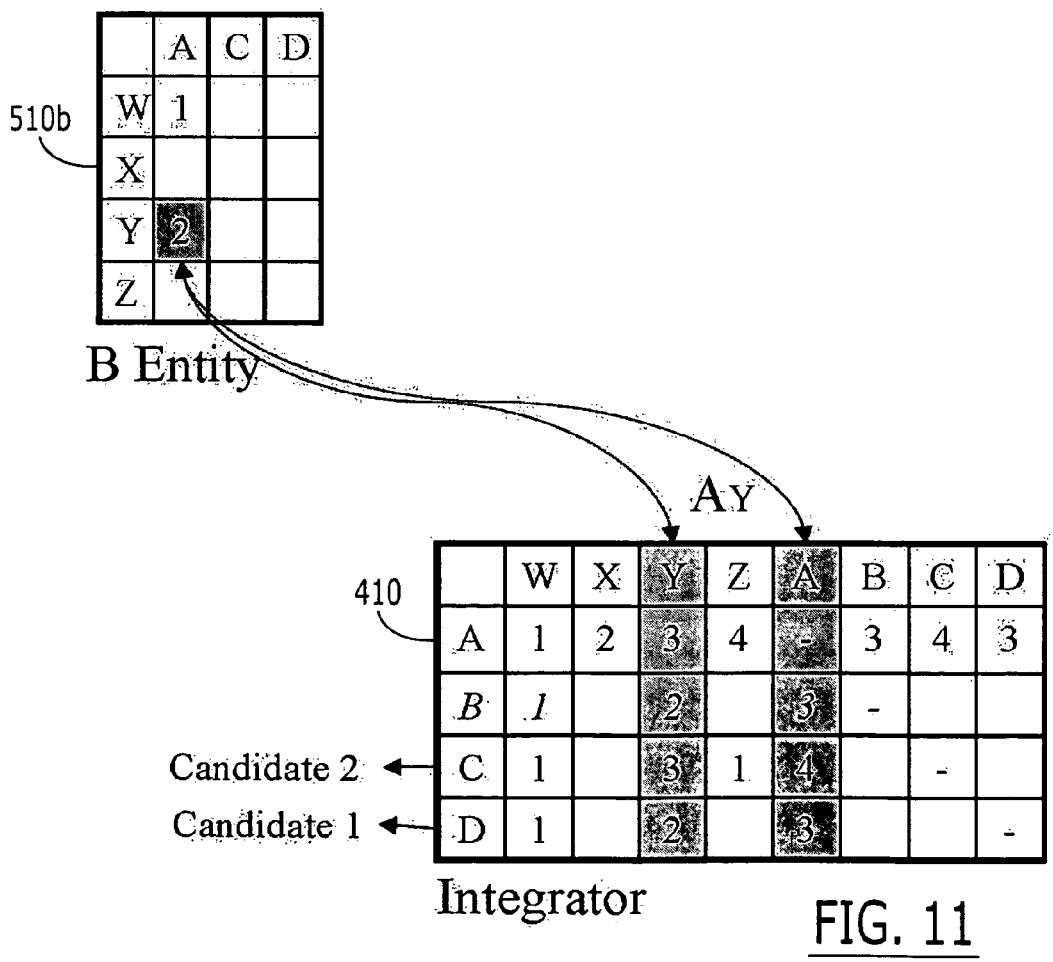
FIG. 11 is an example of obtaining nearest neighbor candidates according to embodiments of FIG. 10.

FIG. 11 demonstrates an example of one observed entity pair $A_Y$ from Entity B. Although it is possible to ask all the other entity memories 510 about $A_Y$, this exhaustive search may be impractical. The integrator memory 410 provides a more efficient associative lookup, even if not as nonlinear and specific as each entity memory 510. Again referring to the specific example of the associative memory, given Person:A and City:Y as observed entities, the integrator memory 410 can recall associated persons (aside from the original Person:B). In this example, Person:D is the strongest candidate with association to both Person:A and City:Y. Person:C is the next best candidate, only associated with City:Y. Note that Person:A is logically excluded from being a candidate, because if Person:A is a known associate to Person:B, he/she cannot also be an alias of Person:B.

Figure 12:
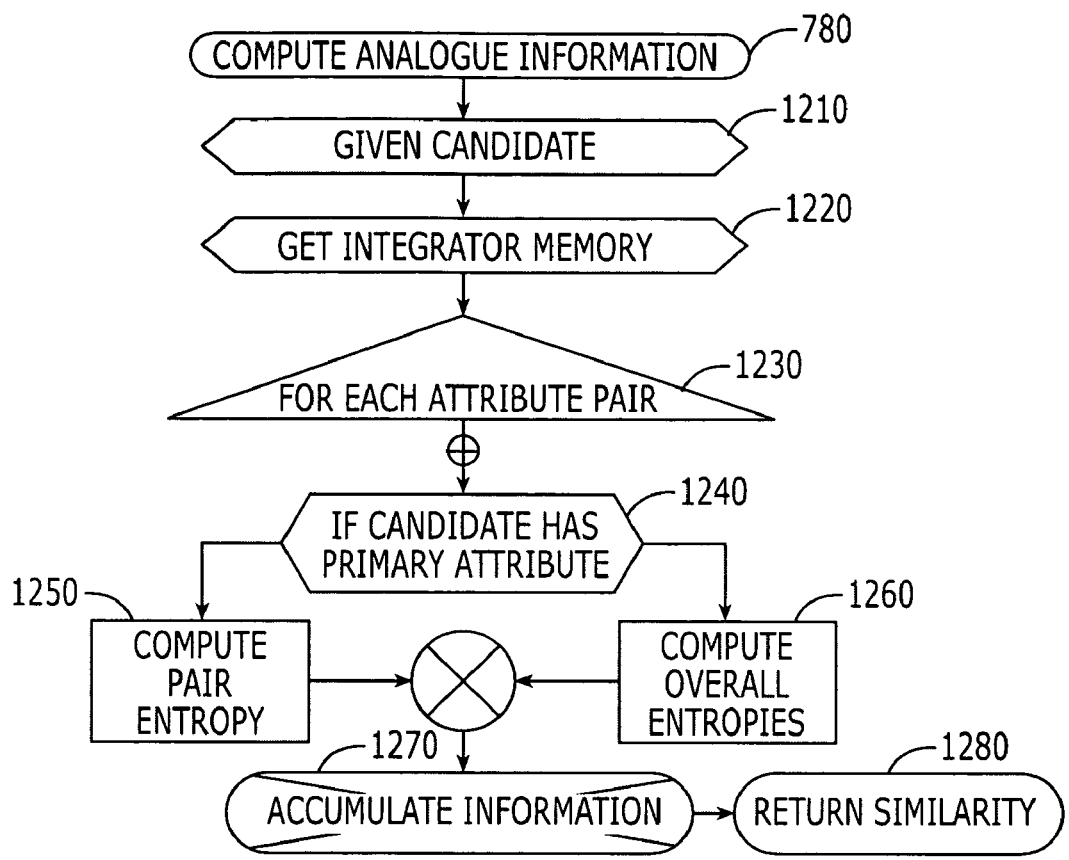
FIG. 12 is a flowchart of operations that may be performed to compute analog information according to various embodiments of the present invention.

FIG. 12 is a flowchart of operations that may be performed to compute analog information, which may correspond to Block 780 of FIG. 7. The accumulated analog information can provide a similarity measure, as was described above. Thus, as used herein, a similarity measure is obtained by accumulating analog information. Moreover, analog information may be computed according to some embodiments of the present invention by computing a normalized entropy inverted. The normalized entropy inverted may be computed by determining a similarity of a given entity to another entity from a perspective of a third entity, relative to an overall similarity of entities to one another from the perspective of the third entity. This normalized entropy inverted may be computed as shown in FIG. 12. More particularly, for a given candidate at Block 1210, the relevant integrator memory 510 is obtained at Block 1220, and for each attribute pair at Block 1230, if a candidate has a primary attribute at Block 1240, then pair entropy is computed at Block 1250, and overall entropies are computed at Block 1260. These entropies are then combined at Block 1290 and accumulated at Block 1270, and a measure of similarity is returned at Block 1280.

More specifically, the similarity measure can be determined by accumulating analog information, where analog information is given by the formula:

$$\text{Analog information} = 1 - \left(\frac{\text{overall entropy} - \text{pair entropy}}{\log \text{maximum overall entropy}}\right),$$

where "pair entropy" means the entropy of the given entity and the other entity in the pair from the perspective of the third entity, "overall entropy" means the overall entropy of entities to one another from the perspective of the third entity, and "maximum overall entropy" means the maximum possible entropy of the entities to one another from the perspective of the third entity.

An example of calculating analog information according to some embodiments of the invention will now be illustrated. Suppose the counts, corresponding to a column of the integrator memory 410 with respect to a given entity are 1, 1, 1, 150, 2000 and 2001, and the pair being used to compute the analog information is the counts of 2000 and 2001. Then, the pair entropy is the entropy between 2000 and 2001, the overall entropy is the overall entropy between the counts of 1, 1, 1, 150, 2000 and 2001, and the maximum overall entropy is the maximum overall entropy that is attainable for the six counts. Table 1 illustrates the results of computing analog information for various combinations of pairs for the counts of 1, 1, 1, 150, 2000 and 2001 using the above formula.

TABLE 1

| Count 1 | Count 2 | Analog Information |
| --- | --- | --- |
| 2001 | 1 | 0.53933 |
| 2000 | 1 | 0.539331 |
| 150 | 1 | 0.55916 |
| 2001 | 150 | 0.678107 |
| 2000 | 150 | 0.678154 |
| 2001 | 2000 | 0.923784 |
| 1 | 1 | 0.923784 |

The analog information is presented in Table 1 in rank order going down the columns of the table.

Additional discussion of the computation of a similarity measure according to various embodiments of the present invention now will be provided. In particular, entropy is a measure of information bits, but its actual values generally are unbounded. Furthermore, entropy generally is specific to a given distribution and may be difficult to compare across different distributions and different entities. Therefore, instead of raw entropy, some embodiments of the invention use an information score which inverts and normalizes the entropy value itself. Some embodiments of the invention can also use caching, updating, and differencing, as will now be described.

In particular, normalization may be accomplished by comparing entropy to a maximum overall entropy. The maximum overall entropy is defined as the largest possible entropy given the size of a set of numbers. Maximum overall entropy is usually based only on what is called the "support size", i.e., the total number of numbers including zeros. However, because embodiments of the invention may defer the assumption that a zero is really a zero (because absence of evidence may not be evidence of absence), the maximum overall entropy may be computed from the size of the set of non-zero numbers. Given the information that is known, maximum overall entropy defines the greatest degree of disorder (lack of information). Thus, overall entropy/maximum overall entropy defines the normalized degree of disorder, ranging from 0-1.

Moreover, to compute how much weight to assign to each attribute, it may be desirable to know how much information, not disorder, it contains. This can be obtained by inversion, and to again keep the range of information score from 0-1, it can be defined as 1−(overall entropy/maximum overall entropy). Inverted, as a score of information, this can then be used as a measure of information-based similarity. If two entities share the same attribute, the maximum contribution to similarity should equal 1. However, to the degree that the attribute counts are common and uninformative, the information score should drop and so should the degree of informative similarity.

The computation of such entropy may be computationally expensive. As presented in the above formula, the formula is simple, but when given extremely large integrator memories 410, thousands and even millions of counts and their probabilities might need to be computed each time, because entropy may account for all non-zero values for any row or column. Instead, according to some embodiments of the invention, manipulation of the entropy formula can provide an incremental update. As presented in FIGS. 6 and 13, the integrator memory 410 also includes an entropy cache 612 associated therewith, which is dynamically updated as new associations enter the integrator memory itself. More specifically, the variables T and S that are stored in the entropy cache 612 may be computed as follows:

Let C denote an array of non-negative integers, indexed from 1 to n, and let C[k] denote the k-th element of C. To avoid the trivial case, assume that some of the C[k] are strictly positive. C induces a probability function P, as follows:

Let $$T = \sum_{k=1}^{n} C[k] > 0,$$

and let P[k]=C[k]/T. Then the elements P[k] are non-negative and sum to 1, as required. The entropy of P, denoted H(P), is defined by $$-H(P) = \sum_{k=1}^{n} P[k]\log P[k].$$

Some of the P[k] may equal 0, and the logarithm function is undefined at 0, so a convention may be used that x log x denotes 0 whenever x=0. In order to express H in terms of C and T:

$$-H(P) =$$
$$\sum_{k=1}^{n} P[k]\log P[k] =$$
$$\sum_{k=1}^{n} (C[k]/T)\log(C[k]/T) =$$
$$(1/T)\sum_{k=1}^{n} C[k](\log C[k] - \log T) =$$
$$(1/T)\sum_{k=1}^{n} C[k]\log C[k] - (1/T)\sum_{k=1}^{n} C[k]\log T =$$
$$(1/T)\sum_{k=1}^{n} C[k]\log C[k] - \log T\left((1/T)\sum_{k=1}^{n} C[k]\right) =$$
$$(1/T)\sum_{k=1}^{n} C[k]\log C[k] - \log T =$$
$$S/T - \log T, \text{ where } S = \sum_{k=1}^{n} C[k]\log C[k].$$

If the value of C[k] changes from α to β, H can therefore be recomputed using:

T ⇒ T−α+β; and

S ⇒ S−α log α+β log β

Accordingly, the above calculations show that when an associative count is updated in the integrator 410, as new source data is input, entropy can be recomputed by recomputing the variable T and recomputing the variable S according to the above formulas. These two variables T and S then may be stored in the entropy cache 612 and incremented without the need to recalculate entropy with each change in each count.

A similarity score according to embodiments of the invention can measure and accumulate the information that separates a pair of signatures from all other signatures. The informative weight of an entity is given by its information score, but this weight considers the entity's information in general, across all entities. To be more precise, it is desired to know entity-by-entity how much the third entity is similar across the two entities in distinguishing them from all others. As such, the information content between only the two entities may count. If the pair-information is subtracted from the total information, the difference represents how much information separates these two entities from all other entities of the same class. Rather than more abstract and general weightings of similarity, the specific similarity of the associative counts allows a definition of similarity as the distinctiveness of such fine-grained statistics.

Consider some of the extreme cases: If the target and candidate entities are the two and only two associative counts for the entire attribute, then the pair-entropy is the total entropy, and all the entity's information is useful to distinguish these two entities from each other. All of the entity's information is between them. At another extreme, if the entity has many associative counts with high entropy but the two counts for the target and candidate are the same, then all of the information separates them-together from all the other entities in the class.

Thus, FIG. 12 describes the overall flow for computing differential information as a measure of similarity. Given an entity and a candidate, and for each mutual attribute in the entity's signature and candidate's signature, the overall entropy is fetched from the entropy cache 612 and the pair entropy is computed from the specific pair of counts. Pair entropy is subtracted from the entity's total entropy, which is then normalized and inverted as a measure the distinctive information score. These information scores are accumulated across all mutual entities as a total measure of similarity.

Figure 13:
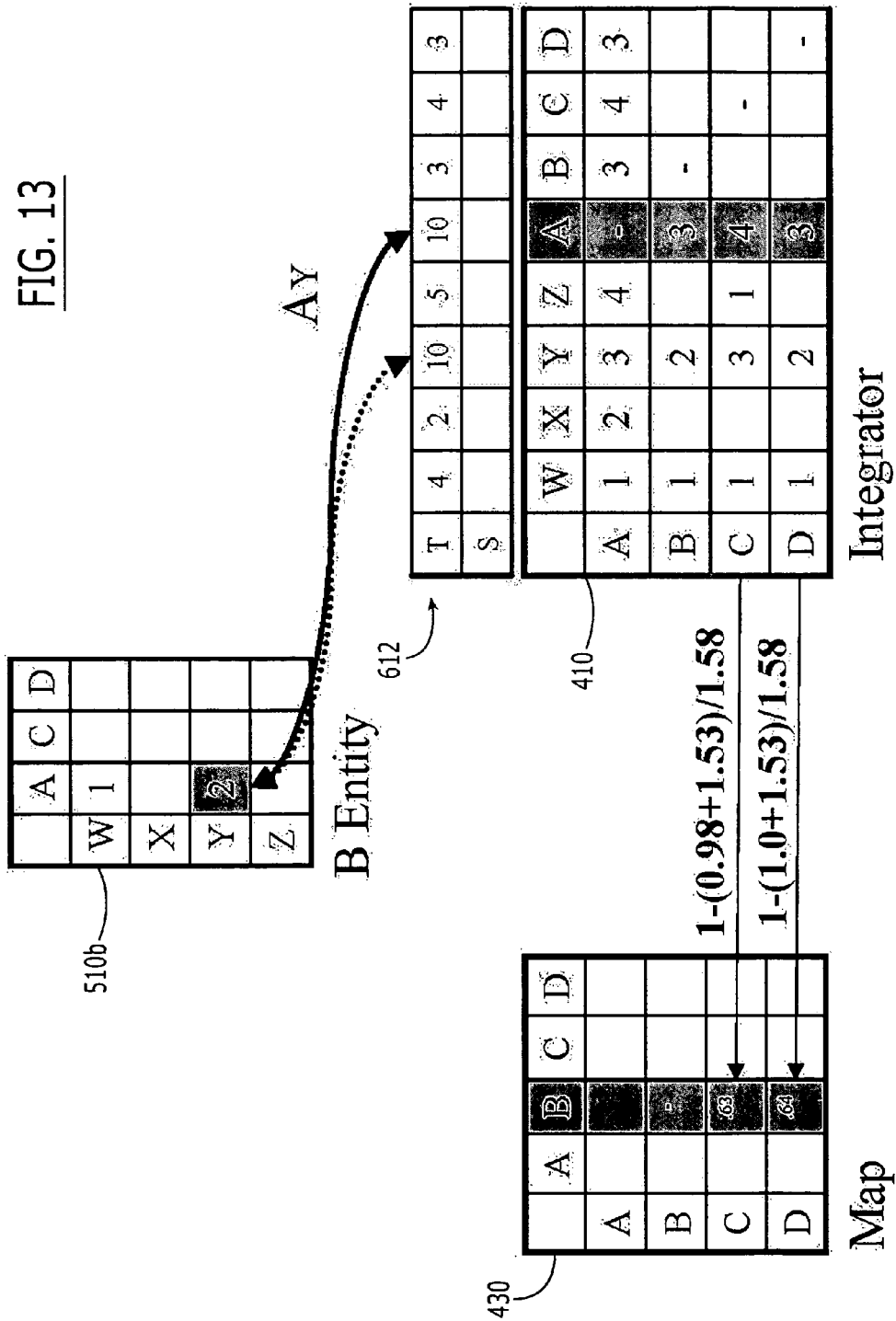
FIG. 13 illustrates an example of computing analog information according to embodiments of FIG. 12.

FIG. 13 demonstrates the storage of the similarity metric within the cognitive map 430. Given Person:B as the target (third) entity, the similarity scores to Person:D and Person:C are recorded. This map 430 is not necessarily symmetric, because the similarity score of Person:C back to Person:A cannot be assumed to be the same. Beginning with the signature of Person:C, the recall of his/her nearest neighbors, and the existence of entity pairs generally produces a different set of analogies to Person:C. Generally speaking, it cannot be assumed that the reciprocal score will be the same value or that the reciprocal entity will even be included as a candidate.

Fundamentally for some applications, the messiness of naturally distributed data does not guarantee that all entities even will see all the data. The very counts between one person and another might be inconsistent. However, such inconsistencies and differences in entity perspectives adds even less probability that two entities will agree in counts, analog similarity scores, and rank order of the candidates. This rarity may then be capitalized, according to some embodiments of the invention, by the filtering of reciprocal coherence—when the entities agree, as will now be described. It will also be understood that filtering by reciprocal coherence may be used, in other embodiments of the invention, where bidirectional counts are provided between entities.

Identification of first and second entities as being analogies if the first entity has the strongest similarity measure with respect to the second entity and the second entity has the strongest similarity measure with respect to the first entity, according to embodiments of the invention, which may correspond to Block 230 of FIG. 2, now will be described. In particular, the calculating of a similarity score and the rank ordering based on similarity, as was described above, can be rich and effective, but may only be a method of scoring and ranking. Beyond this, it may be desirable to further refine or hone the candidate rankings to find the best similarities. As a signal detection task, analogy detection based only on similarity may still be subject to many false alarms when faced with high population noise. In the case of alias detection, for example, many people may be highly similar to each other, but not be aliases. More strongly stated, everybody is most similar to one other person, even if they are dissimilar. In other words, the analogy process will return scores and rank orders for each and every target, but this is not to say that all this information represents the best information.

Figure 14:
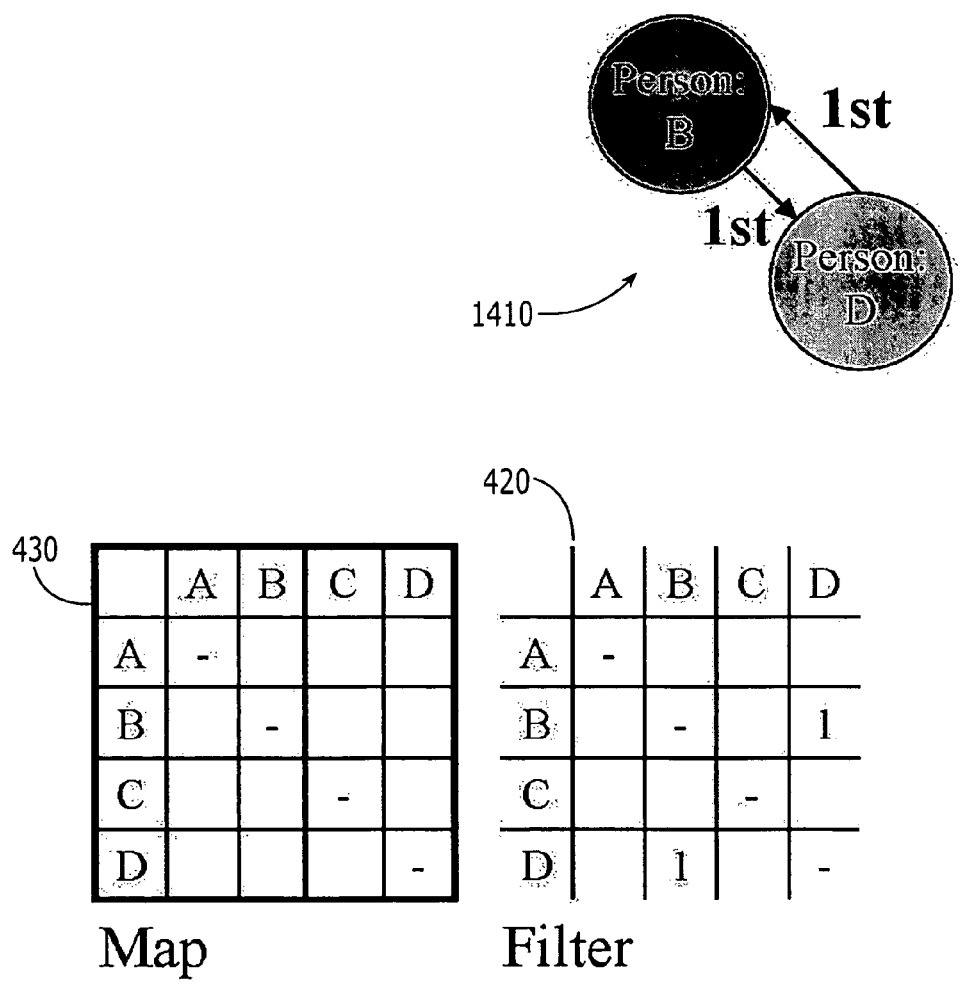
FIG. 14 illustrates identifying reciprocal entities according to various embodiments of the present invention.

Rather than add the arbitrariness of some threshold value as is conventional, some embodiments of the present invention can provide more natural thresholds. In particular, rather than cut the analogy lists at one or another similarity score, some embodiments of the invention use the property of reciprocity to define a natural filter of these scores. FIG. 14 continues with the example from FIG. 13. Given the similarity measures of the map 430, the rank order of similarities for each entity, from its perspective, can also be computed in the filter 420. In fact, rather than similarity, per se, the only measure that needs to be stored in the cognitive map can be the rank orderings. In general, two entities have a rank order of other entities that are similar to each of them. Whenever the first entity in one list agrees back as also first in its list, the first place ranking is reciprocal. In this case, as shown in FIG. 14, Person:A thinks that Person:D is closest, and Person:D thinks Person:A is closest. They are reciprocal to this rank order of 1. This is also shown schematically in the entity diagram 1410 of FIG. 14.

Considering FIG. 14 in terms of a graph, order 1 reciprocity defines those places in a weighted graph where two nodes are closer to each other than to any other nodes. There is always at least one such pair in any graph, and never more than N/2 such pairs, where N is the number entities. While there are on the order of $N^2$ number of analogy similarities possible in the cognitive map 430, there are only on the order of $1/N^2$ likely points of first order reciprocity. Thus, the analogy process can provide one level of filtering as a matter of analogy detection, while reciprocal coherence can add yet another level of filtering.

Figure 15:
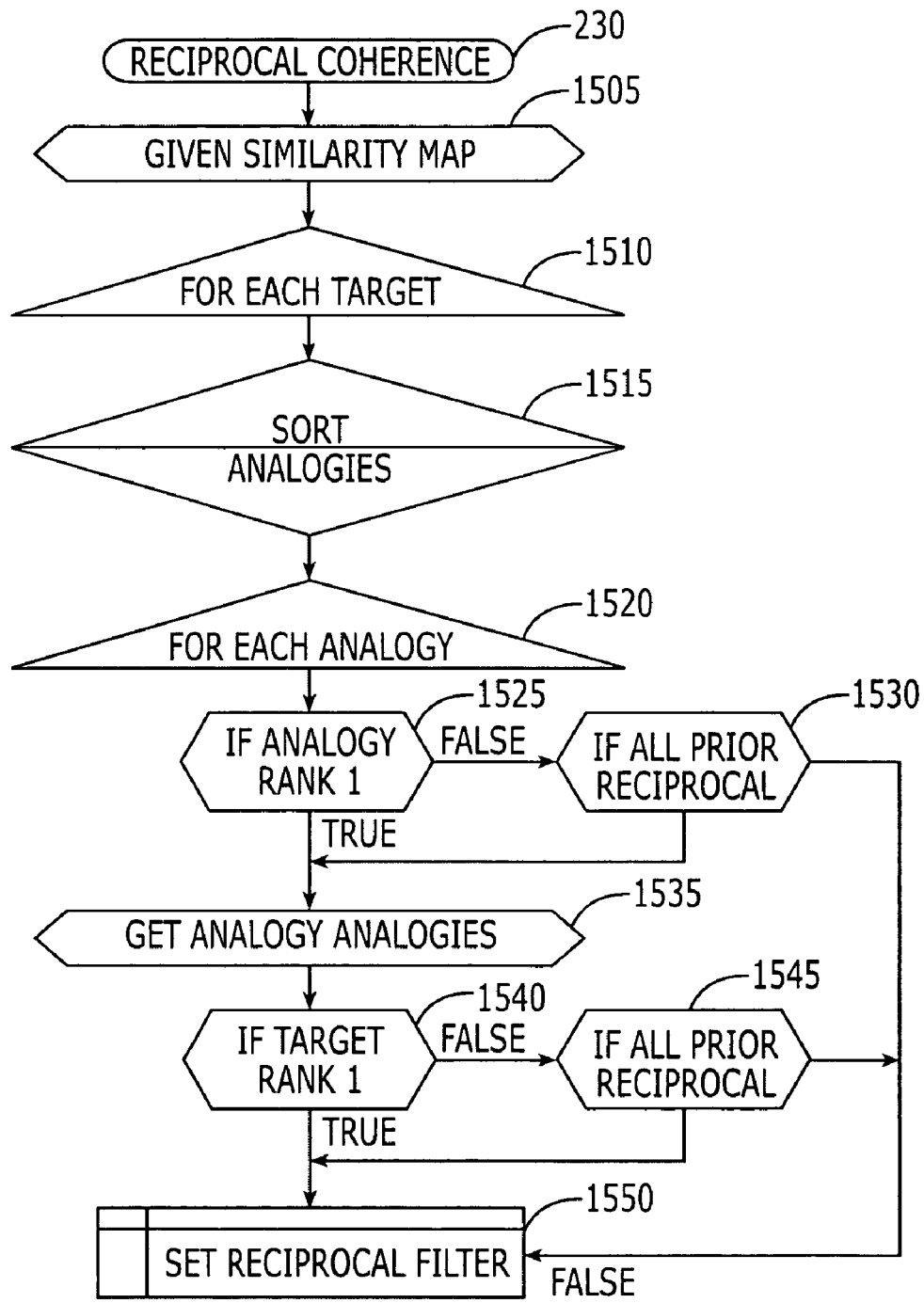
FIG. 15 is a flowchart of operations that may be used to determine reciprocal coherence according to various embodiments of the present invention.

FIG. 15 is a flowchart of operations that may be used to determine reciprocal coherence, which may correspond to Block 230 of FIG. 2. Given the similarity map (Block 1505) and their rank order for each target entity (Block 1510), call each candidate a true analog, once the distinctive information is included in the similarity score. The analogies are sorted at Block 1515. For each analogy (Block 1520), if the analogy is rank 1, its analogies (Block 1535) are also ranked, and if the target is the rank 1 analogy of the analogy (Block 1540), then this reciprocity is stored in the (transient) reciprocal filter at Block 1550.

Figure 16:
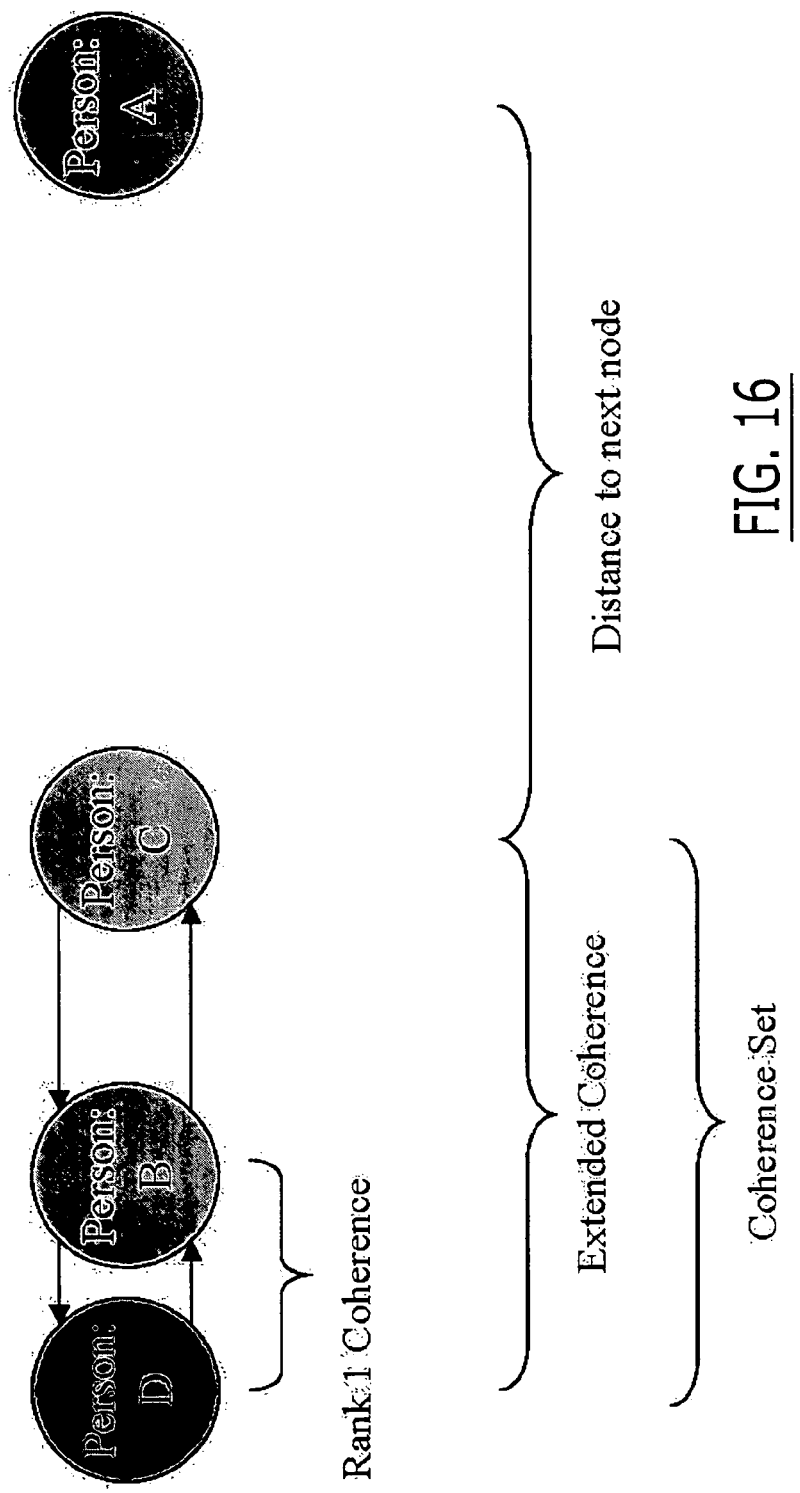
FIG. 16 illustrates an example of a reciprocal coherence set that may be obtained according to various embodiments of the present invention.

FIG. 15 also describes how reciprocity is extended to other members of the analogy list. If a target is found to be reciprocal to its rank 1 analogy, then it is also possible to evaluate other analogies down the list. In other words, even if the analogy is not rank 1, if all analogies about it are reciprocal (Blocks 1530 and 1545), then it too is still a possibility to enter the coherence set. These operations can proceed as if the reciprocal rank 1 relationships were removed from the analogy sets and the process is repeated, moving the next most similar entities into the rank 1 position. As shown in FIG. 15, the reciprocal relationship when moving down the list should still be satisfied by both entities, the target and the analogy. FIG. 16 graphically illustrates how this reciprocal relation can extend beyond rank 1, but can still locate the natural "breaks" in similarity, where a set of entities can be seen as disjoint from others.

It will be understood that embodiments of the invention can be generalized to the mutual reciprocity of any rank order (1, 2, 3, or more). However, the natural, extreme threshold of rank order 1 is most severe and may be most informative as the most discriminatory honing of coherence sets from all the information in the cognitive map.

Figure 17:
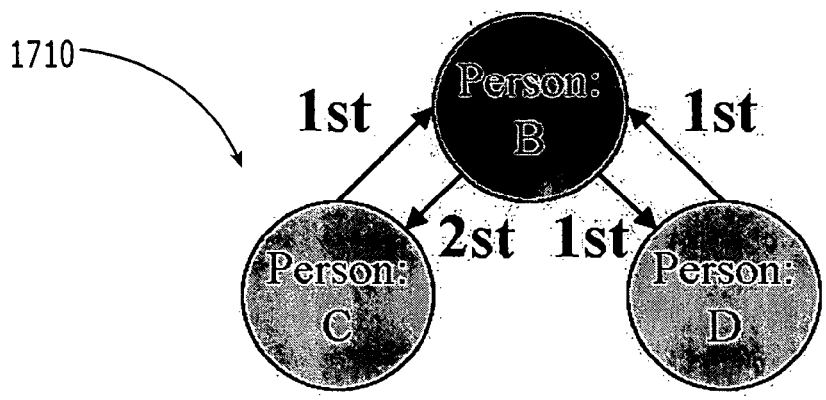
FIG. 17 illustrates construction of a subgraph of similarities according to various embodiments of the present invention.

FIG. 17 graphically illustrates construction of a subgraph of similarities 1710 based on reciprocity. FIG. 17 demonstrates how the extension of reciprocity grows to include Person:B, Person:D, and then Person:C as within a single connected graph. These three entities are members of a cluster, but more than just a cluster, the pair-wise reciprocal links form a sub-graph, not a fully connected clique.

In summary, embodiments of the invention can be based on the evidence provided by real data. Associations can be defined by data correlations while entropy can be used to decorrelate spurious associations. Finally, coherence provides an additional filter of these associations, revealing only those that are most reasonable to report. Such filtering can be based on natural groupings rather than arbitrary thresholds and other parameters for typical segmentation. Reciprocity, the agreement between at least two perspectives, can define the natural basis for coherence.

Distance measures such as cosine and Jacquard generally assume complete knowledge in the vector description. In other words, the vector that describes a document or an entity is a list of the values that are apparently true. However, such differencing methods may also assume that missing values are in fact missing. As in the Jacquard method, missing values add some discount to similarity. In the real world of messy, incomplete, real time, and changing data, the absence of evidence is not evidence of absence. In alias detection for example, a new identity will arise for which there is little information as yet, compared to important targets for which a great deal of information is already well known. This differential lack in knowledge should not penalize the degree of similarity that is so far apparent. Embodiments of the invention can assume a more pure adherence to the facts, and only the facts, in measuring similarity. In document similarity as another example, here too, absence of a term is not necessarily absence, unless the vector provides that all concept, relational, and latent semantic similarities have also been tested for possible inclusion.

Moreover, embodiments of the invention can build semantic networks from real data, which is complex and messy, but can also offer opportunities for deeper metrics. Rather than the mere existence of particular attributes or links, such data variability can be used to ascertain the information content of the link. Some conventional data cleansing techniques are beginning to include Inverted Document Frequency (IDF) as at least some measure of informativeness. In other words, some attributes are more important than others. For instance, in international travel, the city of London might be expected to appear more often than Timbuktu. Highly informative similarities should be weighted more; the attribute of traveling to Timbuktu is, therefore, more informative than traveling to London. However, IDF is only an approximation of the informativeness in a given term. Embodiments of the invention can use a more precise measure than IDF. In particular, embodiments of the invention can provide a specific formulation of entropy as a measure of differential information, as was described extensively above.

As was also described above, entropy-based similarity according to some embodiments of the invention generally is highly directional. Thus, the information available to one node is unlikely to be identical for another node. This creates an asymmetrical similarity matrix, which is not typical nor even generally desirable for the assumptions of other clustering techniques. Beyond even the assumption of triangularity equality between sets of distances, a single "distance" is not the same from both perspectives, in some embodiments of the invention. On the other hand, this makes any "confirmation" between the perspectives all the rarer and better able to "hone" on the most coherent, mutual similarities. Shared nearest neighbor methods may provide for some aspects of reciprocity. However, shared nearest neighbor methods account for common third-party neighbors, whereas, in some embodiments of the invention, for pure reciprocity with asymmetric weights, both perspectives in the pair itself require the primacy of each other (and then their neighbors in course). Coherence can be rarer and more selective, according to embodiments of the invention. In other embodiments of the invention, filtering by reciprocal coherence may be provided even when bidirectional (symmetric) weights are used.

Also beyond shared nearest neighbors, some embodiments of the invention can take the asymmetric similarity matrix one step further by then analyzing the graph structure of the coherent subgroup. While shared neighbor methods generally are non-centroid and non-exhaustive, they still may be used as merely a way to segment a set of points into group membership. In contrast, embodiments of the invention can analyze the internal structure of each group and use such measures to rank the subgroups themselves. Rather than clustering, whether by globular or non-globular methods, the purpose of analogy detection can be more akin to a signal detection task. While segmentation typically tries to exhaustively place all points in one cluster or another, this need not be performed by embodiments of the invention. Embodiments of the invention may only want to know about those "clumps" of coherence that resonate as the crème de la crème analogies. Alias detection for example, may not be interested in clustering a population, but only wants to find those rare clumps of identities that are likely aliases of each other. Document clustering as another example, may not care to organize all the documents but only to present the most coherent subsets of documents that define major, integrating topics. For such signal detection applications based on analogy, embodiments of the invention can combine similarity scoring, ranking, subgrouping with additional scoring and ranking of the subgroups by looking at their graph structure. As a signal detection task, the true analogies should be found in the best subgraphs as additionally defined by the graph structure itself. The "noise" of other links can be irrelevant.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of detecting analogies among a plurality of entities comprising:
   obtaining associative counts among the plurality of entities;
   computing respective similarity measures among respective given entities and other entities among the plurality of entities, using the associative counts, by determining a similarity of the given entity to another entity from a perspective of a third entity, relative to an overall similarity of entities to one another from the perspective of the third entity; and
   identifying first and second entities from the plurality of entities as being analogies if the first entity has a strongest similarity measure with respect to the second entity and the second entity also has a strongest similarity measure with respect to the first entity,
   wherein determining a similarity of the given entity to another entity from a perspective of a third entity, relative to an overall similarity of entities to one another from the perspective of the third entity comprises:
   computing a pair entropy of the given entity and the other entity from the perspective of the third entity;
   computing an overall entropy of the plurality of entities to one another from the perspective of the third entity;
   computing a maximum overall entropy of the plurality of entities to one another from the perspective of the third entity; and
   combining the pair entropy of the given entity and the other entity from the perspective of the third entity, the overall entropy of the plurality of entities to one another from the perspective of the third entity and the maximum overall entropy of the plurality of entities to one another from the perspective of the third entity.

2. A method according to claim 1 wherein the combining comprises dividing the overall entropy of the plurality of entities to one another from the perspective of the third entity minus the pair entropy of the given entity and the other entity from the perspective of the third entity by a log of the maximum overall entropy of the plurality of entities to one another from the perspective of the third entity to obtain a result.

3. A method according to claim 2 wherein the combining further comprises subtracting the result from one.

4. A method according to claim 1 wherein computing an overall entropy of the plurality of entities to one another from the perspective of the third entity comprises incrementing at least one variable as new associative counts are obtained so that the overall entropy need not be recomputed as new associative counts are obtained.

5. A method of determining a similarity of a given entity to another entity among a plurality of entities comprising:
   computing a pair entropy of the given entity and the other entity from a perspective of a third entity;
   computing an overall entropy of the plurality of entities to one another from the perspective of the third entity;
   computing a maximum overall entropy of the plurality of entities to one another from the perspective of the third entity;
   combining the pair entropy of the given entity and the other entity from the perspective of the third entity, the overall entropy of the plurality of entities to one another from the perspective of the third entity and the maximum overall entropy of the plurality of entities to one another from the perspective of the third entity to thereby determine the similarity of the given entity to another entity among the plurality of entities; and
   storing the pair entropy, the overall entropy, the maximum overall entropy and/or the similarity of the given entity to another entity among the plurality of entities.

6. A method according to claim 5 wherein the combining comprises dividing the overall entropy of the plurality of entities to one another from the perspective of the third entity minus the pair entropy of the given entity and the other entity from the perspective of the third entity by a log of the maximum overall entropy of the plurality of entities to one another from the perspective of the third entity to obtain a result.

7. A method according to claim 6 wherein the combining further comprises subtracting the result from one.

8. A method according to claim 5 wherein computing an overall entropy of the plurality of entities to one another from the perspective of the third entity comprises incrementing at least one variable as new associative counts are obtained so that the overall entropy need not be recomputed as new associative counts are obtained.

9. A system of detecting analogies among a plurality of entities comprising:
   an integrator memory that is configured to store therein associative counts among the plurality of entities;
   a cognitive map that is configured to store therein respective similarity measures among respective given entities and other entities among the plurality of entities, based on the associative counts, where a respective similarity measure is a similarity of the given entity to another entity from a perspective of a third entity, relative to an overall similarity of entities to one another from the perspective of the third entity;
   a reciprocal filter that is configured to identify first and second entities from the plurality of entities as being analogies if the first entity has a strongest similarity measure with respect to the second entity and the second entity also has a strongest similarity measure with respect to the first entity; and a processor that is configured to determine the similarity of the given entity to another entity from a perspective of a third entity, relative to an overall similarity of entities to one another from the perspective of the third entity by performing the following:

computing a pair entropy of the given entity and the other entity from the perspective of the third entity;

computing an overall entropy of the plurality of entities to one another from the perspective of the third entity;

computing a maximum overall entropy of the plurality of entities to one another from the perspective of the third entity; and combining the pair entropy of the given entity and the other entity from the perspective of the third entity, the overall entropy of the plurality of entities to one another from the perspective of the third entity and the maximum overall entropy of the plurality of entities to one another from the perspective of the third entity.

10. A system according to claim 9 wherein the combining comprises dividing the overall entropy of the plurality of entities to one another from the perspective of the third entity minus the pair entropy of the given entity and the other entity from the perspective of the third entity by a log of the maximum overall entropy of the plurality of entities to one another from the perspective of the third entity to obtain a result.

11. A system according to claim 10 wherein the combining further comprises subtracting the result from one.

12. A computer program product for detecting analogies among a plurality of entities, the computer program product comprising a computer usable storage medium having computer-readable program code embodied in the medium, the computer-readable program code comprising:

computer-readable program code that is configured to obtain associative counts among the plurality of entities;

computer-readable program code that is configured to compute respective similarity measures among respective given entities and other entities among the plurality of entities, using the associative counts, by determining a similarity of the given entity to another entity from a perspective of a third entity, relative to an overall similarity of entities to one another from the perspective of the third entity; and computer-readable program code that is configured to identify first and second entities from the plurality of entities as being analogies if the first entity has a strongest similarity measure with respect to the second entity and the second entity also has a strongest similarity measure with respect to the first entity, wherein the computer-readable program code that is configured to compute respective similarity measures among respective given entities and other entities among the plurality of entities, using the associative counts, by determining a similarity of the given entity to another entity from a perspective of a third entity, relative to an overall similarity of entities to one another from the perspective of the third entity comprises:

computer-readable program code that is configured to compute a pair entropy of the given entity and the other entity from the perspective of the third entity;

computer-readable program code that is configured to compute an overall entropy of the plurality of entities to one another from the perspective of the third entity;

computer-readable program code that is configured to compute a maximum overall entropy of the plurality of entities to one another from the perspective of the third entity; and computer-readable program code that is configured to combine the pair entropy of the given entity and the other entity from the perspective of the third entity, the overall entropy of the plurality of entities to one another from the perspective of the third entity and the maximum overall entropy of the plurality of entities to one another from the perspective of the third entity.

13. A computer program product according to claim 12 wherein the computer-readable program code that is configured to combine comprises computer-readable program code that is configured to divide the overall entropy of the plurality of entities to one another from the perspective of the third entity minus the pair entropy of the given entity and the other entity from the perspective of the third entity by a log of the maximum overall entropy of the plurality of entities to one another from the perspective of the third entity to obtain a result.

14. A computer program product according to claim 13 wherein the computer-readable program code that is configured to combine further comprises computer-readable program code that is configured to subtract the result from one.

15. A computer program product according to claim 12 wherein the computer-readable program code that is configured to compute an overall entropy of the plurality of entities to one another from the perspective of the third entity comprises computer-readable program code that is configured to increment at least one variable as new associative counts are obtained so that the overall entropy need not be recomputed as new associative counts are obtained.

16. A computer program product for determining a similarity of a given entity to another entity among a plurality of entities, the computer program product comprising a computer usable storage medium having computer-readable program code embodied in the medium, the computer-readable program code comprising:

computer-readable program code that is configured to compute a pair entropy of the given entity and the other entity from a perspective of a third entity;

computer-readable program code that is configured to compute an overall entropy of the plurality of entities to one another from the perspective of the third entity;

computer-readable program code that is configured to compute a maximum overall entropy of the plurality of entities to one another from the perspective of the third entity;

computer-readable program code that is configured to combine the pair entropy of the given entity and the other entity from the perspective of the third entity, the overall entropy of the plurality of entities to one another from the perspective of the third entity and the maximum overall entropy of the plurality of entities to one another from the perspective of the third entity to thereby determine the similarity of the given entity to another entity among the plurality of entities; and computer-readable program code that is configured to store the pair entropy, the overall entropy, the maximum overall entropy and/or the similarity of the given entity to another entity among the plurality of entities.

17. A computer program product according to claim 16 wherein the computer-readable program code that is configured to combine comprises computer-readable program code that is configured to divide the overall entropy of the plurality of entities to one another from the perspective of the third entity minus the pair entropy of the given entity and the other entity from the perspective of the third entity by a log of the maximum overall entropy of the plurality of entities to one another from the perspective of the third entity to obtain a result.

18. A computer program product according to claim 17 wherein the computer-readable program code that is configured to combine further comprises computer-readable program code that is configured to subtract the result from one.

19. A computer program product according to claim 16 wherein the computer-readable program code that is configured to compute an overall entropy of the plurality of entities to one another from the perspective of the third entity comprises computer-readable program code that is configured to increment at least one variable as new associative counts are obtained so that the overall entropy need not be recomputed as new associative counts are obtained.

* * * * *